United States Patent
Wiechers

(10) Patent No.: US 9,322,390 B2
(45) Date of Patent: Apr. 26, 2016

(54) METHOD FOR REPAIRING A POWER RAIL HOUSING OF A WIND POWER PLANT, POWER RAIL HOUSING AND REPAIR KIT FOR CARRYING OUT THE METHOD

(71) Applicant: Flyteg GmbH & Co. KG, Hamburg (DE)

(72) Inventor: Joerg Wiechers, Bilsen (DE)

(73) Assignee: Flyteg GmbH & Co. KG, Hamburg (DE)

( * ) Notice: Subject to any disclaimer, the term of this patent is extended or adjusted under 35 U.S.C. 154(b) by 0 days.

(21) Appl. No.: 14/411,127

(22) PCT Filed: Jun. 12, 2013

(86) PCT No.: PCT/EP2013/062131
§ 371 (c)(1),
(2) Date: Dec. 24, 2014

(87) PCT Pub. No.: WO2014/001085
PCT Pub. Date: Jan. 3, 2014

(65) Prior Publication Data
US 2015/0322915 A1 Nov. 12, 2015

(30) Foreign Application Priority Data
Jun. 28, 2012 (DE) .................. 10 2012 105 669

(51) Int. Cl.
*F03D 11/00* (2006.01)
*F03D 1/00* (2006.01)
(Continued)

(52) U.S. Cl.
CPC .............. *F03D 1/003* (2013.01); *F03D 11/00* (2013.01); *F03D 11/0066* (2013.01);
(Continued)

(58) Field of Classification Search
CPC ........................................ F03D 1/003
USPC ................................. 174/88 B, 520
See application file for complete search history.

(56) References Cited

U.S. PATENT DOCUMENTS 2,353,121 A 7/1944 Adam et al.
4,950,841 A 8/1990 Walker et al.
(Continued)

FOREIGN PATENT DOCUMENTS

DE 79 18 984 4/1979
DE 10 2008 058 129 5/2010
(Continued)

OTHER PUBLICATIONS

Click Bond Product Guide, Pioneering > Advanced > Solutions, Click Bond Inc., Carson City, NV 89706, USA, Mar. 3, 2009, pp. 1-19.
(Continued)

*Primary Examiner* — Hung V Ngo
(74) *Attorney, Agent, or Firm* — Bachman & LaPointe, PC

(57) ABSTRACT

The invention relates to a method for repairing a power rail housing (100) of a wind power plant (10), in which the power rail housing (100) is composed of a plurality of power rail housing sections (32, 33) each having an at least essentially rectangular cross section and being connected to one another in the longitudinal direction, wherein the connection of the power rail housing sections (32, 33) is carried out by means of preferably plate-shaped connecting elements (37, 38), said power rail housing sections (32, 33) covering a connecting region of power rails (27 to 29) within the power rail housing (100), wherein the connecting elements (37, 38) are connected by means of screws (42, 43) to the two power rail housing sections (32, 33) which adjoin one another in the longitudinal direction.

10 Claims, 2 Drawing Sheets

(51) Int. Cl.
  *H02G 3/06* (2006.01)
  *H02G 5/06* (2006.01)

(52) U.S. Cl.
  CPC ............ *H02G 3/0608* (2013.01); *H02G 5/061* (2013.01); *F05B 2230/80* (2013.01); *F05B 2260/301* (2013.01); *Y02E 10/722* (2013.01); *Y02P 70/523* (2015.11); *Y10T 29/49742* (2015.01)

(56) References Cited

U.S. PATENT DOCUMENTS

| | | | |
|---|---|---|---|
| 6,435,888 B1* | 8/2002 | Reed, Jr. | H01R 4/30 174/88 B |
| 7,449,635 B2* | 11/2008 | Wiant | H01R 4/304 174/68.2 |
| 8,512,057 B2 | 8/2013 | Haar et al. | |
| 2005/0042099 A1* | 2/2005 | Wobben | F03D 11/00 416/132 B |
| 2012/0032546 A1* | 2/2012 | Numajiri | F03D 1/003 310/156.12 |
| 2013/0170929 A1* | 7/2013 | Wiechers | F03D 1/003 414/222.01 |
| 2014/0259590 A1* | 9/2014 | Eddy | F03D 11/0008 29/402.03 |

FOREIGN PATENT DOCUMENTS

| | | |
|---|---|---|
| EP | 2 143 937 | 1/2010 |
| EP | 2 169 223 | 3/2010 |
| GB | 2482923 | 2/2012 |

OTHER PUBLICATIONS

International search report dated Oct. 2, 2013.

* cited by examiner

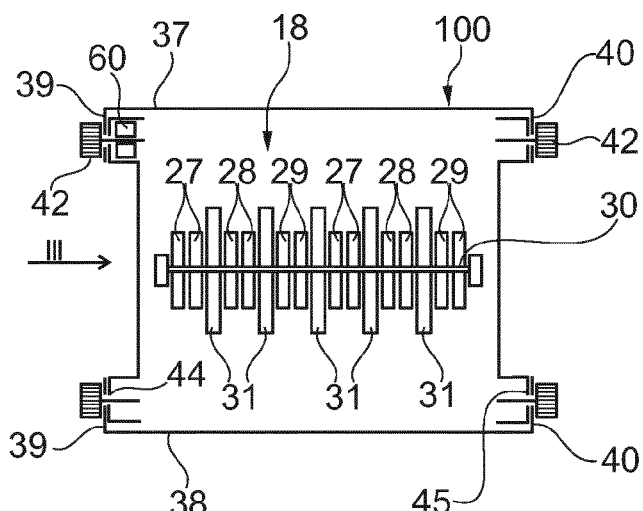
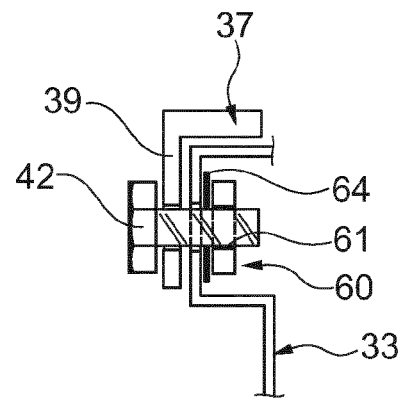
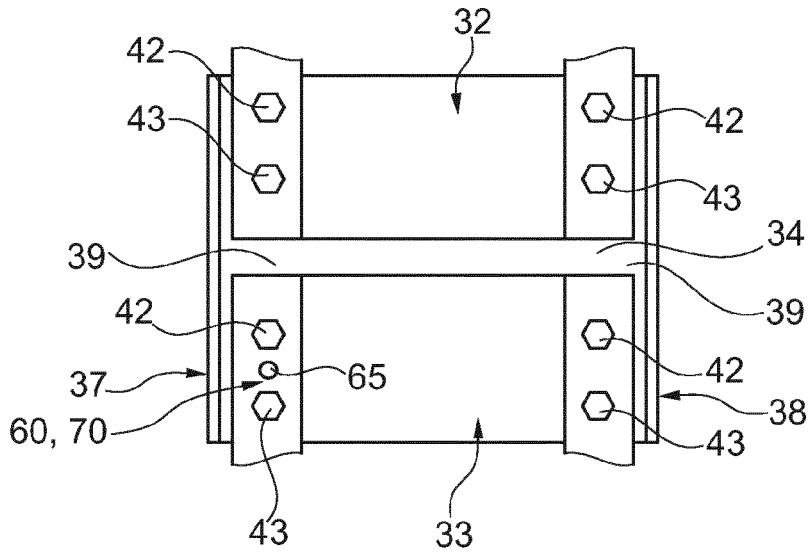
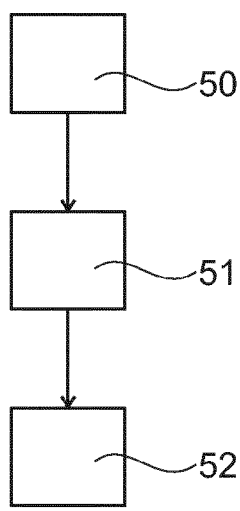
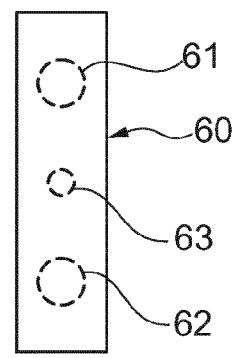
Fig. 2
Fig. 4
Fig. 3
Fig. 5
Fig. 6

METHOD FOR REPAIRING A POWER RAIL HOUSING OF A WIND POWER PLANT, POWER RAIL HOUSING AND REPAIR KIT FOR CARRYING OUT THE METHOD

BACKGROUND OF THE INVENTION

The invention relates to a method for repairing a power rail housing of a wind power plant. Furthermore, the invention relates to a power rail housing repaired according to the method according to the invention, and to a repair kit for carrying out the method.

Within a tower of a wind power plant the power rails, which are provided for carrying the current and which comprise, in particular, aluminium, are arranged within a multi-component power rail housing. By means of the power rail housing, in particular, direct access or direct contact and thus the danger of shortcuts in the current-carrying power rails are prevented. In practical application such a power rail housing comprises a multitude of interconnected power rail housing sections that on the sides that face each other are interconnected by means of connecting elements. These connecting elements are, in particular, designed in the form of cover plates or perforated plates that at the same time cover the connecting region between the power rails. The connecting elements are arranged at opposite sides of the power rail housing having an at least essentially rectangular cross section. A rear connecting element or cover plate is situated on the side facing the inner wall of the tower, while a front cover plate faces the interior of the tower. After removal, for example, of the front connecting element (cover plate) the connecting region between the power rails can be inspected or serviced.

Already during installation of the individual power rail housing sections, or in the course of maintenance work or similar, due to installation faults or inaccuracies during installation it can occur that, for example, a screw that is used to connect the cover plate to the power rail housing sections is pulled from a thread region, or that the thread provided in the power rail housing section for anchoring the screw, which thread has been put in place beforehand, is damaged. As a result of this, re-installation of the connecting element or of the cover plate is then impossible. Thus, in practical application, for the sake of simplicity or because of the lack of alternatives, the corresponding power rail housing section comprising the faulty or damaged thread or the pulled-out screw situated in the thread is disposed of and replaced with a new power rail housing section. If delays in installation, service or repair are to be avoided, the aforementioned procedure makes it necessary for wind power stations to keep corresponding power rail housing sections in stock as spare parts. Furthermore, such an exchange is relatively expensive, if nothing else for reasons associated with investment in the power rail housing section to be replaced.

DISCLOSURE OF THE INVENTION

Based on the knowledge of prior art described above, it is the object of the invention to provide an economically advantageous method for repairing a power rail housing of a wind power plant. According to the invention this object is met by a method for repairing a power rail housing of a wind power plant with the characteristics disclosed herein. According to the invention it is essentially provided that if there is a damaged or unusable thread in a power rail housing section, in a first step the region of the thread is enlarged in diameter; that in a second step, lining up with the thread, a carrier element that comprises a replacement thread for the screw is connected to the power rail housing section comprising the damaged thread; and in that in a third step, for installation of the connecting element, the screw is fed through the enlarged-diameter region of the power rail housing section and is screwed into the replacement thread. In other words, this means that with the use of the carrier element, which represents a separate and additional component, a new option for anchoring the screw is provided, wherein as a result of enlarging or drilling open the original thread region in the power rail housing section it is ensured that the screw can be fed through the original region of the power rail housing section or of the thread, and can be made to establish an operative connection with the replacement thread comprised in the carrier element. Such a repair method according to the invention makes it possible to further use the original power rail housing section, and to prevent it from having to be disposed of. Thus, in contrast to prior art it is not necessary to keep in stock at the wind power plant, for example, power rail housing sections as replacements for power rail housing sections that are no longer usable.

Advantageous improvements of the method according to the invention for repairing a power rail housing of a wind power plant are also stated herein. Any combinations comprising at least two characteristics disclosed in the claims, in the description and/or in the figures are within the scope of the invention.

Especially preferred is a method in which the carrier element is connected to the power rail housing section by means of an adhesive layer. This makes it possible that for installation of the (new) screw the carrier element is pre-positioned or fixed at the intended location within the power rail housing section, without other fastening elements for the carrier element having to be used for this, which fastening elements would otherwise render installation more difficult or impossible.

As an alternative or in conjunction with the above-mentioned adhesive layer, in a further particularly preferred variant of the invention it is provided that the carrier element is connected to the wall of the power rail housing section by means of an additional screw, wherein an additional through-hole is formed in the wall of the power rail housing section, and an additional thread is formed in the carrier element. Such a method makes it possible to mechanically fix and position the carrier element within the power rail housing section, and consequently said carrier element is positioned during installation of the connecting element or of the screw on the place provided for this purpose within the enlarged-diameter hole of the original thread.

In particular in cases where additional components for positioning the carrier element are undesirable for reasons of design and construction, or where they interfere during installation of the connecting elements, moreover, in a further embodiment of the invention it is provided that with the use of an adhesive layer the additional screw is removed prior to the third step (screwing the screw into the replacement thread in the carrier element) being carried out. Such removal of the screw is possible as soon as the adhesive layer affixes or holds the carrier element in the power rail housing section after a corresponding curing time. Depending on the type of adhesive used, in practical application even a few minutes are sufficient, and consequently the actual repair process is not prolonged as a result of this.

A further advantageous method provides that if there are several screws in the region of a longitudinal side of the power rail housing section, the diameters of all the threads in the power rail housing section are enlarged, and that for each thread the carrier element comprises a replacement thread. As a result of this it is always sufficient to use a single standardised carrier element in which, in advance according to the (known and standardised) hole pattern, corresponding replacement threads for the threads in the power rail thread sections have been formed. As a result of this it is, in particular, not necessary to make corresponding replacement threads in the carrier element on site, i.e. in the region of the wind power plant, and consequently handling is further simplified.

The invention also relates to a power rail housing comprising at least one power rail housing section in which the aforesaid was repaired according to a method according to the invention and comprises a carrier element that is connected to a power rail housing section. Such a power rail housing provides an advantage in that it can also be used subsequently, if applicable in some other location in the wind power plant, because said power rail housing in its functionality corresponds to a new power rail housing section.

For carrying out the method according to the invention, furthermore, a repair kit is provided that comprises at least one preferably strip-shaped carrier element with at least one replacement thread and with auxiliary means for fastening the carrier element to a wall of the power rail housing section.

BRIEF DESCRIPTION OF THE DRAWINGS

Further characteristics, advantages and details of the invention are stated in the following description of preferred exemplary embodiments and with reference to the drawing.

The drawing shows in:

FIG. 2 a cross section of the connecting region between two power rail housing sections, FIG. 3 a view in the direction of the arrow III of FIG. 2, FIG. 4 an enlarged view of a detail of FIG. 2, FIG. 5 a flow chart for illustrating the repair method according to the invention, and FIG. 6 a detailed view of a carrier element as part of a repair kit.

In the figures, identical elements or elements with similar functions have the same reference characters.

DETAILED DESCRIPTION

Figure 1:
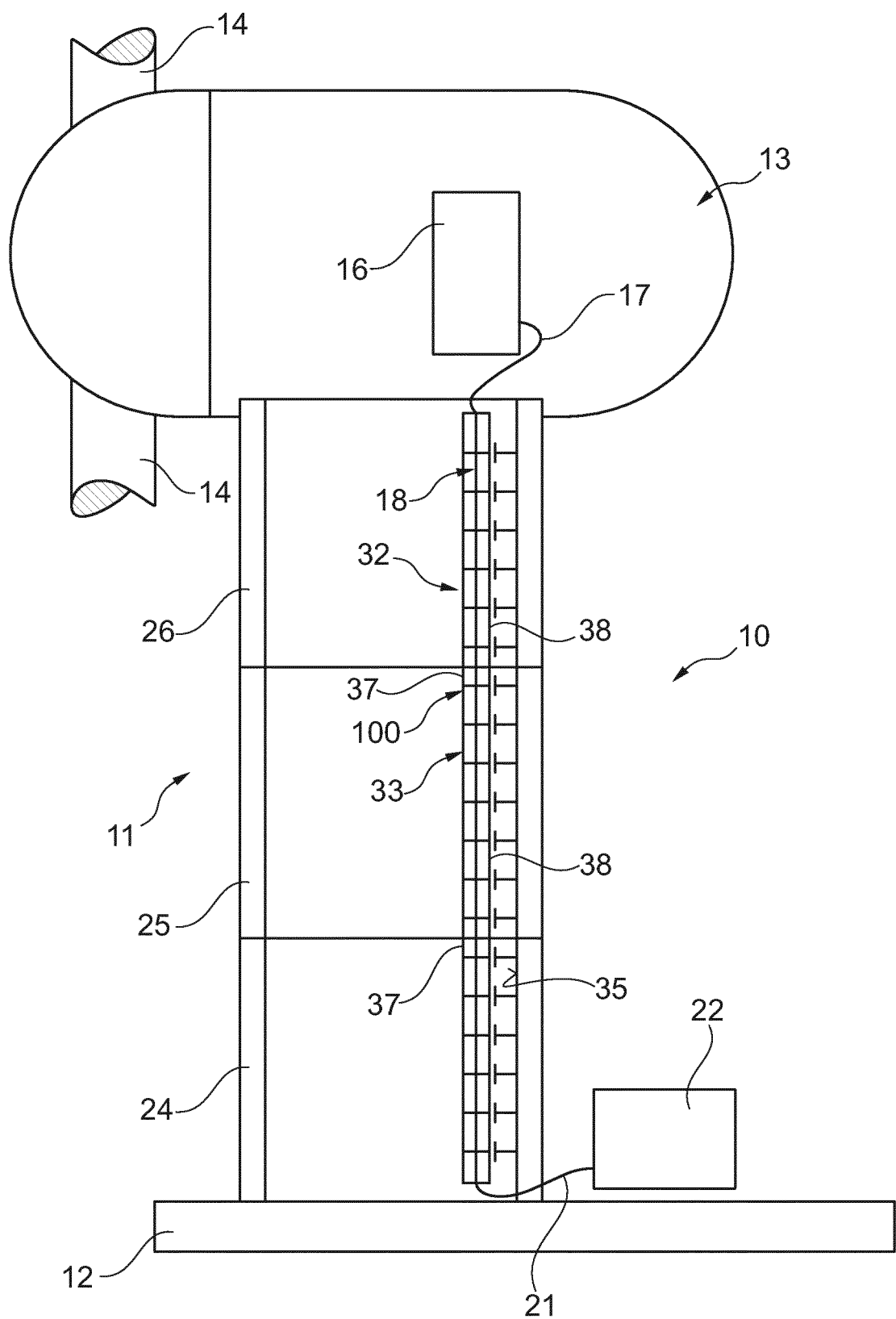
FIG. 1 a greatly simplified longitudinal section of a wind power plant.

FIG. 1 is a greatly simplified view of the basic design of a wind power plant 10. The wind power plant 10 comprises a tower 11 that is arranged on a base 12. At the top of the tower 11 a nacelle 13 is arranged in which, among other things, the rotor blades 14 are rotationally held. Within the nacelle 13 there is a generator 16. The generator 16 is coupled to an upper connecting line 17 and to an upper connection with an arrangement 18 of interconnecting power rails (merely hinted at). The arrangement 18 of interconnecting power rails extends over the entire length or height of the tower 11. In the region of the base 12 of the tower 11 the arrangement 18 of interconnecting power rails is connected to a power grid station 22 by means of a further, lower connecting line 21 or a lower connection.

The tower 11 comprises, for example, three sleeve-like tower segments 24 to 26, arranged one over the other. Such a tower segment 24 to 26 typically comprises a length of approximately 20 m, so that the overall height of the tower 11 (without the nacelle 13) is approximately 60 m. Within each tower segment 24 to 26 a multitude of power rails 27 to 29 extend as part of the arrangement 18 of interconnecting power rails, in particular in the form of elongated aluminium rails. Each of the power rails 27 to 29 forms a phase of a rotary current line, wherein for example according to FIG. 2 in each case six power rails 27 to 29 (i.e. twice three phases) are provided. In this arrangement, within each tower segment 24 to 26 (when viewed in the longitudinal direction of the tower segment 24 to 26), in each case several power rails 27 to 29 can be provided. It is essential that in the connecting region shown in FIG. 2, between two tower segments 24, 25 or 25, 26, the power rails 27 to 29 associated with the respective tower segment 24 to 26, or situated within said tower segment 24 to 26, are interconnected in the longitudinal direction so that the electrical through-arrangement 18 of interconnecting power rails is formed that is coupled to the two connecting lines 17, 21.

The connection between the individual power rails 27 to 29 takes place, for example, by means of a terminal connector 30, shown in FIG. 2, which terminal connector 30 engages apertures or slits formed in the power rails 27 to 29, and which terminal connector 30 presses the power rails 27, 28 against each other in order to establish an electrical connection between the power rails 27 to 29 of the tower segments 24 to 26. Moreover, it is in particular necessary to arrange insulating elements or insulating plates 31, which comprise a ceramic material, between the individual power rails 27 to 29, which insulating elements or insulating plates 31 electrically insulate the individual power rails 27 to 29, each of which forms a phase.

The arrangement 18 of interconnecting power rails is housed within a power rail housing 100 that typically extends over the entire length of the arrangement 18 of interconnecting power rails or of the tower segments 24 to 26. The power rail housing 100, which has an at least essentially rectangular cross section, again comprises a multitude of power rail housing sections 32, 33 interconnected in the longitudinal direction. In the illustration according to FIG. 1 it is assumed that the respective upper power rail housing sections 32 in the tower segments 24 to 26 are connected to the respective lower power rail housing sections 33 in the tower segments 25, 26. Of course, it is possible or provided for that within each tower segment 24 to 26 the power rail housing 100 comprises a multitude of interconnected power rail housing sections 32, 33, which in each case typically have a length of, for example, 2 m.

The power rail housing 100 is used to protect from manipulation or contact the power rails 27 to 29 arranged within the power rail housing 100 or the arrangement 18 of interconnecting power rails. In particular it must be ensured that no electrical short circuits occur between the individual power rails 27 to 29.

In order to make it possible to compensate for movements of the tower 11 of the wind power plant 10 or movements of the individual tower segments 24 to 26, the power rail housing sections 32, 33 between the tower segments 24, 25 or 25, 26 are arranged with a small axial gap 34 of, for example, 10 mm. On the side facing the inner tower wall 35, and on the side facing away from the inner tower wall 35 the tower rail housing sections 32, 33 are interconnected by means of a respective front or rear connecting element 37, 38. In particular, the connecting elements 37, 38 cover the connecting region between the power rails 27 to 29 of the individual tower segments 24 to 26.

The connecting elements 37, 38 are, for example, in each case designed as cover panels or cover plates with longitudinal strips 39, 40 comprising a perpendicular return edge. The connecting elements 37, 38, which in the longitudinal direction are arranged in the middle of the axial gap 34, are laterally, on the power rail housing sections 32, 33, connected by means of through-holes, formed on the longitudinal strips 39, 40, in each case with the use of two screws 42, 43, to the corresponding power rail housing section 32, 33, wherein the arrangement of the screws 42, 43 takes place in the longitudinal direction of the power rail housing 100. Thus for each of the connecting elements 37, 38 eight screws 42, 43 are used.

In order to form the screw connections, in a section of the power rail housing 32, 33 which section comprises a U-shaped cross section, the power rail housing sections 32, 33 in each case comprise a threaded hole 44, 45. The threaded hole 44, 45 comprises, for example, typically an M6 thread. For installation or after corresponding service or repair of the power rail housing sections 32, 33 it is necessary to reinstall the previously removed connecting elements 37, 38 on the power rail housing sections 32, 33. Because of faulty installation, component tolerances or similar it can happen that during installation of a connecting element 37, 38 when screwing in a screw 42, 43 said screw 42, 43 is pulled out in the region of the threaded hole 44, 45, or that during installation of the screw 42, 43 the associated threaded hole 44, 45 is damaged and consequently can no longer be used for installation of the screw 42, 43. To make it possible to nevertheless continue to use the existing power rail housing section 32, 33, according to the invention it is provided to repair the power rail housing section 32, 33 of the power rail housing 100, which power rail housing section 32, 33 comprises the defective threaded hole 44, 45.

In accordance with FIG. 5 the repair according to the invention provides for at least the following steps: initially, in a first step 50, both the diameter of the affected defective threaded hole 44, 45 and the diameter of the other (undamaged) threaded hole 45, 44 in the respective region of the power rail housing section 32, 33 is enlarged or drilled out. If the (original) threaded hole 44, 45 comprises, for example, an M6 thread, the threaded holes 44, 45 are, for example, enlarged or widened to a diameter of 8 mm. Subsequently, in a second step 51, a carrier element 60 is placed in the region of the threaded hole 44, 45.

The carrier element 60, shown in an individual view in FIG. 6, preferably forms part of a repair kit 70 and comprises, for example, a non-corrosive material, in particular stainless steel, and is strip-shaped in design with a thickness of, for example, 4 mm. The strip-like design of the carrier element 60 results from the design of the power rail housing 100, which design is U-shaped in the region of the threaded hole 44, 45. Preferably, but not limiting, the carrier element 60 is of such a length that within the carrier element 60 two replacement threaded holes 61, 62 are formed whose hole pattern or spacing corresponds to the hole pattern or spacing of the (original) threaded holes 44, 45. In this arrangement the replacement threaded holes 61, 62 are identical in size to the original threaded holes 44, 45; in the described exemplary embodiment they are thus M6 threaded holes 61, 62. Furthermore, for example, in the region between the two replacement threaded holes 61, 62 there is a further threaded hole for example in the form of an M4 thread. Fastening of the carrier element 60 to the power rail housing 100 in the region of the damaged threaded hole 44, 45 takes place in that (preferably by means of a template) corresponding to the hole pattern of the replacement threaded holes 61, 62 and of the further threaded hole 63 an additional hole is formed on the carrier element 60 on the power rail housing section 32, 33 of the power rail housing 100, which additional hole is associated with the further threaded hole and comprises a somewhat larger diameter than the external diameter of the screw used for the further threaded hole 63, in order to be able to better position or centre the carrier element 60.

Furthermore, it is provided that on the facing surfaces of the power rail housing 100 or of the power rail housing section 32, 33 to be repaired, and on the carrier element 60 (i.e. on the side of the power rail housing section 32, 33, which side faces away from the connecting element 37, 38) an adhesive layer 64 is applied that also forms part of the above-mentioned repair kit 70. The second step 51 (fastening the carrier element 60 to the tower rail housing section 32, 33 to be repaired) provides that first the corresponding adhesive layer 64 is applied to the carrier element 60 and subsequently, by means of a further screw 65 (which also forms part of the repair kit 70) the carrier element 60 is positioned in such a manner, within the power rail housing section 32, 33 to be repaired, that the replacement threaded holes 61, 62 are aligned with the original threaded holes 44, 45 or with the enlarged-diameter regions. In order to prevent the adhesive layer 64 resulting in movement of the carrier element 60 during the curing phase, by means of the further screw 65 the carrier element is temporarily fastened or fixed to the corresponding power rail housing section 32, 33. As soon as the curing phase of the adhesive layer 64 is completed, which, for example, typically only takes approximately 10 min. to 15 min., the further screw 65 can be removed. Subsequently, in a third step 52, installation of the connecting element 37, 38 takes place by fastening the screws 42, 43 in the replacement threaded holes 61, 62 of the carrier element 60. Repair of the power rail housing 100 is thus complete.

In addition it should be mentioned that hitherto only the most necessary steps 50 to 52 of the repair method according to the invention have been described. Beyond this it can be provided to carry out further method-related steps, either during the method for repairing or beforehand, which further steps are used for servicing or for ensuring an impeccable repair outcome. For example it can be provided that during the repair basically the connecting screw or the terminal connector 30 between the power rails 27 to 29 is replaced. Furthermore, in particular after drilling open or enlarging the original threaded hole 44, 45, the corresponding regions are vacuum-cleaned in order to remove from the power rail housing 100 any metal shavings that may be present. Moreover, it can be provided that on completion of the installation a screw-lock lacquer is applied to the screws 42, 43 in order to secure said screws 42, 43. The method described so far can be altered or modified in a host of ways without deviating from the scope and nature of the invention. For example, it can be provided that for repair the corresponding power rail housing sections 32, 33 are removed from the tower 11 of the wind power plant 10 in order to make it possible to gain improved access to the power rail housing sections 32, 33. Furthermore, it is imaginable, in a modification of the exemplary embodiment shown, to use a carrier element 60 that comprises only a single replacement threaded hole 61, 62 arranged in the location in which the damaged threaded hole 44, 45 is situated. In this case, however, typically there is a need to use carrier elements 60 of a different design. However, such a method or such modified carrier elements 60 provide an advantage in that there is no need to drill open or enlarge the originally undamaged threaded hole 44, 45. Moreover, it is imaginable to fix the carrier element 60 during the curing time of the adhesive layer 64 not by means of the further screw 65 but instead by means of other suitable clamping elements, for example screw clamps, clamping claws or similar.

The invention claimed is:

1. A method for repairing a power rail housing (100) of a wind power plant (10), in which the power rail housing (100) is composed of a plurality of power rail housing sections (32, 33) each having an at least essentially rectangular cross section and being connected to one another in the longitudinal direction, wherein the connection of the power rail housing sections (32, 33) is carried out by means of plate-shaped connecting elements (37, 38) that cover a connecting region of power rails (27 to 29) within the power rail housing (100), wherein the connecting elements (37, 38) are connected by means of screws (42, 43) to the two power rail housing sections (32, 33) which adjoin one another in the longitudinal direction, and wherein the power rail housing sections (32, 33) comprise threads (44, 45) for anchoring the connecting elements (37, 38) by means of the screws (42, 43), wherein if there is a damaged or otherwise unusable thread (44, 45) on a power rail housing section (32, 33), in a first step the region of the thread (44, 45) is enlarged in diameter; in a second step, lining up with the original thread (44, 45) a carrier element (60) that comprises a replacement thread (61, 62) for the screw (42, 43) is connected to the power rail housing section (32, 33), and in a third step, for installation of the connecting element (37, 38), the screw (42, 43) is fed through the enlarged-diameter region of the power rail housing section (32, 33) and is screwed into the replacement thread (61, 62).

2. The method according to claim 1, wherein the carrier element (60) is connected to the power rail housing section (32, 33) by means of an adhesive layer (64).

3. The method according to claim 1, wherein the carrier element (60) is connected to the power rail housing section (32, 33) by means of an additional screw (65), wherein an additional through-hole is formed in the wall of the power rail housing section, and an additional thread (63) is formed in the carrier element (60).

4. The method according to claim 3, wherein, with the use of an adhesive layer (64) the additional screw (65) is removed prior to the third step being carried out.

5. The method according to claim 1, wherein if there are several screws (42, 43) in the region of a longitudinal side of the power rail housing section (32, 33), the diameters of all the threads (44, 45) in the power rail housing section (32, 33) are enlarged, and wherein for each thread (44, 45) the carrier element (60) comprises a replacement thread (61, 62).

6. A power rail housing (100), which has been repaired according to a method according to claim 1, wherein the power rail housing (100) comprises a power rail housing section (32, 33) that is connected to a carrier element (60).

7. A repair kit (70) for carrying out a method according to claim 1, comprising a strip-shaped carrier element (60) with at least one replacement thread (61, 62) and with auxiliary means for fastening the carrier element (60) to the power rail housing section (32, 33).

8. The repair kit according to claim 7, wherein the auxiliary means comprise at least one adhesive layer (64).

9. The repair kit according to claim 8, wherein the auxiliary means comprise additional means for temporarily fastening the carrier element (60) to the power rail housing section (32, 33).

10. The repair kit according to claim 9, wherein the means for temporarily fastening the carrier element (60) to the power rail housing section (32, 33) comprises a screw (65).

\* \* \* \* \*